United States Patent [19]

Brundidge

[11] 4,416,776
[45] Nov. 22, 1983

[54] OIL FILTER CONSTRUCTION

[76] Inventor: Larry G. Brundidge, 481 45th Pl., NE., Salem, Oreg. 97301

[21] Appl. No.: 401,677

[22] Filed: Jul. 26, 1982

[51] Int. Cl.$^3$ ............................................. B01D 00/00
[52] U.S. Cl. .......................... 210/238; 210/DIG. 17; 74/163
[58] Field of Search ............ 210/DIG. 17, 168, 416.5, 210/232, 238, 248; 123/185 A; 74/163; 242/54 R

[56] References Cited

U.S. PATENT DOCUMENTS

| | | | |
|---|---|---|---|
| 596,479 | 1/1898 | Chapell | 74/163 |
| 1,051,807 | 1/1913 | Eckhart | 74/163 |
| 1,129,427 | 2/1915 | Salisbury | 123/185 A |
| 1,622,289 | 3/1927 | Nelson | 123/185 A |
| 2,522,565 | 9/1950 | Burhans | 210/DIG. 17 |
| 2,746,445 | 5/1956 | Cocklin | 123/185 A |
| 3,042,215 | 7/1960 | Gruner | 210/443 |
| 3,224,585 | 12/1965 | Scavuzzo et al. | 210/DIG. 17 |
| 3,912,633 | 10/1975 | Delaney | 210/168 |
| 4,109,538 | 8/1978 | Glenday et al. | 123/185 A |
| 4,151,823 | 5/1979 | Grosse et al. | 123/196 |
| 4,266,452 | 5/1981 | Crist | 81/121 |
| 4,364,829 | 12/1982 | Atkins et al. | 210/DIG. 17 |

FOREIGN PATENT DOCUMENTS 821728  4/1981  U.S.S.R. ..................... 123/185 A

*Primary Examiner*—Charles N. Hart
*Assistant Examiner*—Wanda L. Millard
*Attorney, Agent, or Firm*—Henderson & Sturm

[57] ABSTRACT

This invention relates to spin-on type oil filter receptacles in general, and more specifically to an improvement to the normal external surface of the body, wherein a plurality of reinforced tapes are wound in opposite directions on either end of the receptacle to facilitate the insertion and removal of the oil filter in close tolerance situations.

8 Claims, 4 Drawing Figures

OIL FILTER CONSTRUCTION

BACKGROUND OF THE INVENTION

As can be seen by reference to the following U.S. Pat. No's. 3,042,215; 4,266,452; 4,151,823 and 3,912,633, there has been quite a bit of inventive activity related to oil filter, per se, filter wrenches, and means to facilitate the changing of the oil filter.

Most of the oil filters in use today are the spin-on variety; wherein the filter body is provided with a centrally disposed female threaded portion, which cooperates with a complementary male threaded portion on the engine mounting plate, in a well recognized manner.

The installation and removal of the oil filter is intended to be a relatively simple operation which is accomplished by rotating the filter body in a clockwise direction to engage the threaded portions in the installation phase; and by rotating the filter body in the counter-clockwise direction to disengage the threaded portions in the removal phase.

In theory, this procedure is simple and foolproof; however, the automotive industry designers have complicated matters by invariably installing the oil filters in virtually inaccessible areas, or locations having very close tolerances. This is particularly true in the case of most of the front wheel drive vehicles manufactured both here and abroad. In addition, the use of currently available filter wrenches, under these circumstances, is usually met with very poor performance, and many times results in damaged filters.

As a result of this problem the present improved oil filter construction was developed to save time in both phases of filter changing, and to allow auto designers greater freedom in the placement and design of engines. However, the greatest benefit will be to the auto owners, who change their own filters at home, and who have struggled for years with skinned knuckles and frustrations.

SUMMARY OF THE INVENTION

An object of this invention is to provide a means for spinning-on and spinning-off a threaded oil filter in close tolerance situations.

A further object of the present invention is to provide means which can easily be adapted to any existing oil filter both to facilitate the installation and removal thereof.

Another object of the present invention is to provide the oil filter with independant means to impart clockwise and counter-clockwise rotation to the oil filter upon sequential removal of the independant means from the exterior of the oil filter body.

Still another object of the present invention is to obviate the need for filter wrenches to install and remove the oil filter.

A still further object of the present invention is to provide an improved oil filter construction, which will allow a person to change their own filters, without the need for separate or additional tools.

Yet another object of the present invention is to provide an oil filter construction that solves the problems confronted by front wheel drive owners, by the simple expedient of providing the exterior surface of the oil filter, with independant counter-acting rotary motion imparting elements.

These and other objects, advantages and novel features of the invention will become apparent from the detailed description which follows, when considered in conjunction with the accompanying drawings.

DETAILED DESCRIPTION OF THE PREFERRED EMBODIMENT

Figure 1:
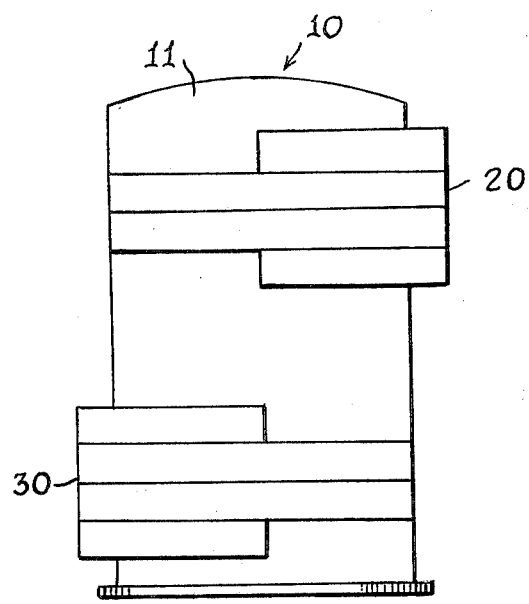
FIG. 1 is a side view of one form of the preferred embodiment

FIG. 1 shows a standard elongated cylindrical oil filter container, which is designated generally as 10. The typical oil filter container normally is provided with a rounded top 11, and an open bottom 12.

Figure 2:
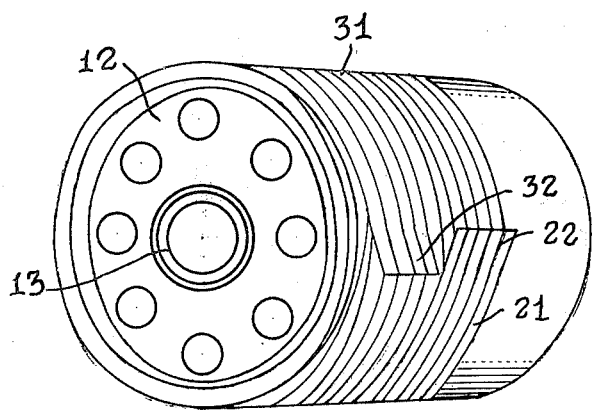
FIG. 2 is a perspective view of another form of the preferred embodiment

As can best be seen by reference to FIG. 2, the bottom 12 of the oil filter container is provided with a threaded aperture 13, which is dimensioned to cooperate with a complementary threaded member on the engine housing, in a well known manner.

In as much as this invention is intended for use on all generally cylindrical spin-on type oil filter containers, the specific construction of the oil filter is not considered to form part of this invention.

Referring again to FIG. 1, it can be seen that the external surface of the oil filter cylinder 10 is provided with a plurality of independant elongated strips of material 20 and 30, which are wrapped repeatedly around the periphery of the cylinder.

One of the elongated strips 20 is wound around the cylinder in the clockwise direction, and the other elongated strip 30 is wound around the cylinder in the counter-clockwise directon. In addition, the number of times that each strip 20 and 30, is wound around the cylinder, should equal or exceed the number of revolutions required, to either threadly engage, or disengage the cylinder from the engine housing.

The strips of material 20 and 30, in all versions of the preferred embodiment, are preferably provided with one or more strands 21, 31 of re-inforcing material such as nylon, mono-filament, or the like, which are incorporated directly into the strip of material, in any one of a number of accepted methods.

The strips of material are preferably formed from nylon and their undersides, with any type of adhesive, such as cyanoacryate, which is suitable for securing the nylon tape to the metal surface of the filter body; yet will also form a releasable bond between the overlapping strips of tape, as the individual strips of tape are unwound. While certain materials for the tape and the adhesive has been mentioned; it is to be understood that there are other strips of commercially available reinforced adhesive tape that would work just as well as the combination mentioned.

The primary considerations for the strips of tape are strength, thinness, and the ability to adhere to the external surface of the oil filter. The reasons for this are, so that after the individual strips 20 and 30, have been wound around the cylinder the appropriate number of times in their respective directions; they will not produce a bulky mass on the exterior surface of the cylinder; yet will be strong enough to impart the desired rotary motion to the cylinder without breaking as they are unwound from the cylinder. In order to facilitate the removal of the tapes 20 and 30, each of them is provided with a grip tape 22, 32 on their free ends.

As mentioned supra, one of the tapes is wound around the cylinder in the clockwise direction and the other is wound in the counter-clockwise direction. Obviously, when the tapes are grasped by their grip tabs for removal, they will impart rotary motion to the cylinder in the same direction that they were wrapped onto the cylinder.

In describing the various forms of the preferred embodiment illustrated in FIGS. 1 thru 4, tape 20 will be referred to as the clockwise wound tape, and tape 30 will refer to the counter-clockwise wound tape.

As can be seen in FIG. 1, the cylinder 10 is provided with the tape 20, disposed proximate its upper end, and the tape 30, disposed proximate its lower end. The reason for this positioning is that tape 20, is the clockwise wound tape, which is used to spin the filter on; on should therefore be position closest to the closed end of the cylinder, to facilitate installation of the cylinder. In addition, less force is involved in installing the filter than when removing it, and greater force can be sustained near the open end 12 of the cylinder when the filter is removed.

In FIG. 2, both of the tapes 20 and 30, are disposed proximate the open end of the cylinder; but again the tape 20 will be located nearer to the closed end of the cylinder. This form of the preferred embodiment is designed to impart more of a force on the cylinder, as close as possible to the location that the actual threading action between the cylinder and the engine takes place.

Figure 3:
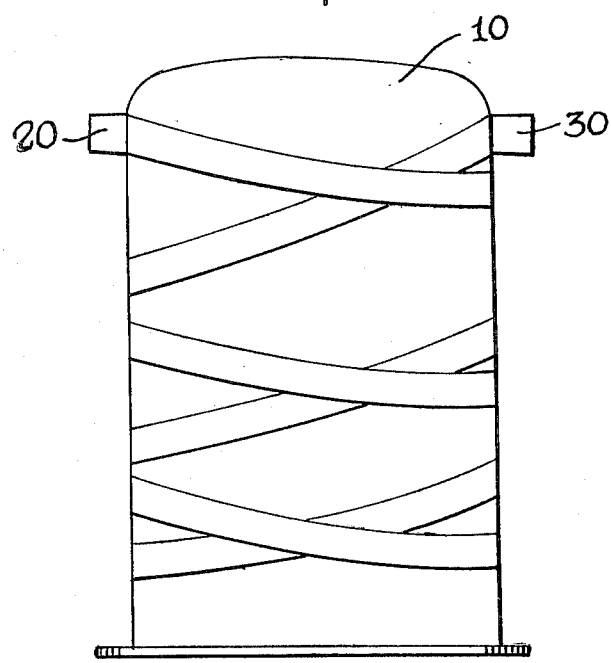
FIG. 3 is a side elevation of still another version of the preferred embodiment

In the embodiment illustrated in FIG. 3, the counter-clockwise wound tape 30 is wound in a spiral fashion starting from the open end of the cylinder and termination at the free end of the grip tab 32, which is disposed proximate the closed end of the cylinder. This form of the preferred embodiment is comtemplated for situations where there is ample clearance in the vicinity of the top of the cylinder. An added benefit of this arrangement is that the counter-clockwise wound tape will not have a double thickness anywhere along the sides of the cylinder, due to the spiral configuration. The clockwise wound tape 20 is then wrapped around the counter-clockwise wound tape in the normal fashion, adjacent to the closed end of the cylinder.

Figure 4:
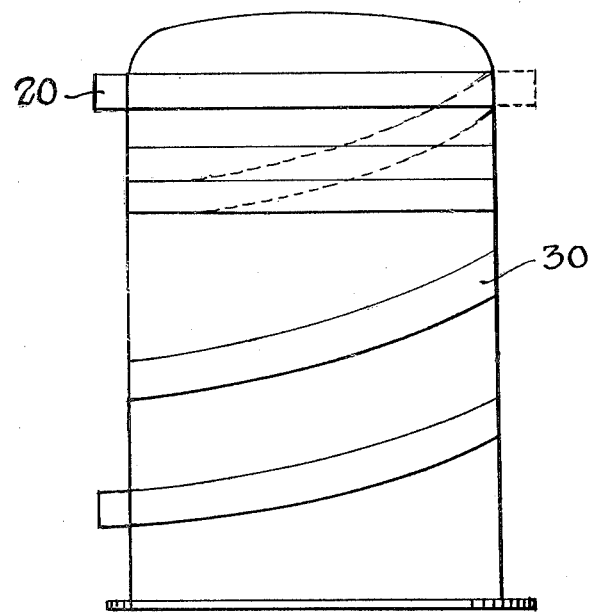
FIG. 4 is a side elevation of yet another form of the preferred embodiment

The final embodiment illustrated in FIG. 4., is for situations where there is very little clearance along the entire length of the cylinder. In this form of the preferred embodiment both of the tapes 20 and 30 are wound around the cylinder in their respective directions in a spiral fashion, so that the sides of the cylinder will only have a double thicknes of tape projecting from its periphery.

It should be obvious by now, that an oil filter body provided with this dual counter wound tape arrangements makes installing and removing an oil filter even in close tolerance situations, a simple task that can be performed without the benefit of specilized tools, such as filter wrenches.

To install the filter onto the engine all that is required is to initially engage the cooperation threaded portions on the oil filter and engine, and then by grasping and pulling the grip tab 22, on tape 20, a clockwise rotary motion will be imparted to the cylinder to spin the filter on.

When the filter has to be replaced, the grip tab 32, on tape 20 is grasped and pulled; and a counter-clockwise rotary motion will be imparted to the oil filter to disengage it from the cylinder.

It should be noted at this point, that the grip tabs 22 and 32, may either be a section of tape which is folded upon itself, so that the adhesive surfaces join, or it may be a separate element secured to the free ends of the tapes.

In an alternate embodiment, (not illustrated) it has been found, that for short filters, the end of the second or counter-wound tape may be attached to the underside of the first tape grip tab, so that when the outer tape is pulled from the filter, it brings the grip tab of the inner tape into the position for removal.

Having thereby disclosed the subject matter of this invention, it should be obvious that many substitutions, modifications and variations of the invention are possible in light of the above teachings. It is therefore to be understood, that the invention as taught and described is only to be limited to the extent of the breadth and scope of the appended claims.

What I claim is:

1. An improved construction for spin-on type oil filter cylinders having an open end, and a closed end; wherein the improvement comprises:
   a first elongated strip of material releasably secured to the cylinder body; wherein the said first strip of material is wrapped a plurality of times around the cylinder body in the clockwise direction, and the removal of said first elongated strip of material from the filter body will tend to impart a rotary movement of the filter body in a counter-clockwise direction, and
   a second elongated strip of material releasably secured to the cylinder body; wherein the said second strip of material is wrapped a plurality of times around the cylinder body in the counter-clockwise direction, and the removal of said second elongated strip of material from the filter body will tend to impart a rotary movement of the filter body in a clockwise direction,
   each of the said strips of material is coated with an adhesive on its underside.

2. An improved construction as in claim 1; wherein, each of the said strips of material are provided with a grip tab on their free ends.

3. An improved construction as in claim 2; wherein, each of the said strips of material are provided with at least one strand of reinforcing material formed integrally therewith.

4. An improved construction as in claim 1; wherein, the first strip of material is disposed on the cylinder body proximate its closed end, and
   the second strip of material is disposed on the cylinder body proximate its open end.

5. An improved construction as in claim 1; wherein, both strips of material are disposed proximate one of the ends of the cylinder body.

6. An improved construction as in claim 1; wherein, the said first strip of material is wrapped over at least a portion of the second strip of material.

7. An improved construction as in claim 1; wherein, the said first strip of material is wrapped over the second strip of material to form at least a double thickness of material around the cylinder body.

8. An improved construction as in claim 1; wherein, the strips of material are in the form of a reinforced adhesive tape.

* * * * *